United States Patent Office 3,388,154
Patented June 11, 1968

3,388,154
METHOD OF PRODUCING GOOD COLOR EPOXIDE-TAURINE CONDENSATION PRODUCTS
Louie S. Bitar, Springfield, and Harold A. Sorgenti, Philadelphia, Pa., assignors to Atlantic Richfield Company, Philadelphia, Pa., a corporation of Pennsylvania
No Drawing. Filed May 23, 1967, Ser. No. 640,471
4 Claims. (Cl. 260—513)

ABSTRACT OF THE DISCLOSURE

Production of substantially color-free condensation products of $C_{10}$–$C_{18}$ 1,2-epoxides and a taurine salt by furfural solvent extracting the $C_{10}$–$C_{18}$ alpha-olefins from which the epoxides are produced.

BACKGROUND OF THE INVENTION

Field of the invention

This invention relates to the production of epoxide-taurine condensation products which are substantially colorfree and, more particularly, it relates to the production of $C_{10}$–$C_{18}$ 1,2 - epoxide-taurine salt condensation products which are substantially free of color by furfural solvent extracting the $C_{10}$–$C_{18}$ alpha-olefin fraction which is converted to the 1,2-epoxide and condensed with the taurine salt.

Description of the prior art

The reaction of salts of taurine such as the sodium salt with high molecular weight 1,2-epoxides, for example, $C_{10}$ to $C_{18}$ epoxides, produces water-soluble compounds which can be utilized as detergents, see U.S. Patent No. 3,084,187. These compounds and the diepoxide taurine condensation products are shown as agents for replacing sodium tripolyphosphate in built detergent compositions in copending application Ser. No. 625,281, filed Mar. 23, 1967 and entitled "Epoxide Taurine Condensation Products and Detergent Compositions Containing Them."

One method of preparing these compounds consists in reacting a 1,2-epoxide having from 10 to 18 carbon atoms in the molecule or a mixture of such epoxides with a taurine salt having the formula $$R-\underset{\underset{H}{|}}{N}-CH_2-CH_2-SO_3M$$

wherein M is ammonium or an alkali metal ion and R is a methyl radical or a beta-hydroxy alkyl radical having the formula

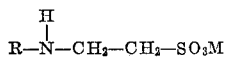

wherein $R_1$ is a methyl radical, an ethyl radical or a propyl radical.

The epoxides are prepared from commercial grade olefins, in particular, alpha-olefins. The method of preparing the epoxides involves reacting the desired olefin fraction with an organic hydroperoxide such as tertiary butyl hydroperoxide in the presence of a metal catalyst such as a molybdenum catalyst. Molybdenum hexacarbonyl is a specific example of a catalyst which is useful in this reaction. This reaction has been described both in the patented art and in the technical literature, see for example, Belgian Patent No. 674,076, dated June 20, 1966. The commercial grade alpha-olefins are generally obtained from the thermal cracking of petroleum paraffin waxes in the desired molecular weight range. This thermal cracking process for the production of monoolefins, in particular alpha-olefins, also produces small quantities of other unsaturated and color producing compounds. When these compounds remain in the alpha-olefin fraction which is to be epoxidized and subsequently the epoxidized olefin condensed with a taurine salt the resulting condensation product has an objectionable color ranging from gray to brown either as a powder or in a water solution. Such a color is objectionable for commercial application, particularly for the production of household detergent formulations.

SUMMARY OF THE INVENTION

The present invention is directed to a method for the production of substantially color-free condensation products of $C_{10}$–$C_{18}$ 1,2-epoxides with a taurine salt by furfural solvent extracting the $C_{10}$–$C_{18}$ olefin fraction from which the epoxides are produced.

It is an object of this invention therefore to provide a process for the production of substantially color-free epoxide-taurine salt condensation products.

It is another object of this invention to provide substantially color-free epoxide-taurine salt condensation products produced from epoxidized alpha-olefins, in turn produced from thermally cracked wax fractions.

Other objects of this invention will be apparent from the further description of the invention which follows and from the claims.

As used in this specification and appended claims the term "$C_{10}$–$C_{18}$ alpha-olefins" refers to terminally unsaturated olefins produced from cracked wax and being substantially straight chain. The term "taurine salt" means compounds having the formula $$R-\underset{\underset{H}{|}}{N}-CH_2-CH_2-SO_3M$$

wherein M is ammonium or an alkali metal ion and R is a methyl radical or a beta-hydroxy alkyl radical having the formula

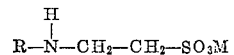

wherein $R_1$ is a methyl radical, an ethyl radical or a propyl radical.

DESCRIPTION OF THE PREFERRED EMBODIMENTS

In accordance with this invention the desired alpha-olefin fraction obtained from thermal cracking a petroleum paraffin wax blend is extracted with furfural in order to remove color-forming compounds from the alpha-olefins. In general, the number of carbon atoms in the desired alpha-olefins is in the range of from 10 to 18 and a particularly preferred range is from 15 to 17. The extraction is carried out at a temperature in the range of from 150° F. to 200° F. with a preferred range of from 155° F. to 175° F. The weight ratio of furfural to the olefin fraction is in the range of from 0.5:1 to 5.0:1. A preferred range is from 1.0:1 to 4.0:1.

The alpha-olefin fraction after being extracted with furfural is thereafter epoxidized in accordance with the afore-mentioned method utilizing an organic hydroperoxide and a molybdenum catalyst or in accordance with other conventional and well-known methods utilizing peroxygenated compounds. The resulting 1,2-epoxide is condensed with a taurine salt of the type which has been described.

In producing the taurine salt condensation product, taurine, in the form of its ammonium or alkali metal salt, is condensed with a low molecular weight epoxide, i.e. one containing from 3 to 5 carbon atoms. The condensation is carried out in the presence of water and is very rapid and exothermic and, in general, gives substantially quantitative yields. Evaporation of the water gives the N-beta-hydroxy $C_3$–$C_5$ alkyl taurine salt. Equal molar quantities of this taurine salt condensation product and the $C_{10}$–$C_{18}$ 1,2-epoxides are reacted in the presence of a small amount of base such as aqueous sodium hydroxide at temperatures in the range of from 80° C. to 120° C. with a reaction time of from 4 to 6 hours. The final condensation product consisting of the N-beta-hydroxy $C_3$–$C_5$ alkyl-N-beta-hydroxy $C_{10}$–$C_{18}$ alkyl taurine salt is recovered by partitioning between a hydrocarbon solvent such as n-hexane and a polar solvent such as methyl alcohol. The final condensation product is obtained from the methyl alcohol layer by evaporation of the solvent. These condensation products have the formula

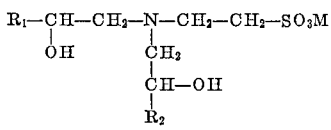

wherein $R_1$ is a straight chain alkyl radical having from 10 to 18 carbon atoms, $R_2$ is an alkyl radical having from 1 to 3 carbon atoms and M is ammonium or an alkali metal ion.

If N-methyltaurine is employed as the material to be condensed with the $C_{10}$–$C_{18}$ 1,2-peroxide fraction the N-methyltaurine is usually employed in the form of its commercial 65 percent aqueous solution of the sodium salt. The $C_{10}$–$C_{18}$ 1,2-epoxide fraction is condensed with the N-methyltaurine in preferably equal molar quantities and at temperatures of from 80° C. to 120° C. although temperatures of 100° C. to 110° C. are preferred. Reaction times of from 4 to 6 hours are generally sufficient.

The condensation may be recovered in the manner described and the N-methyltaurine salt produced has the formula

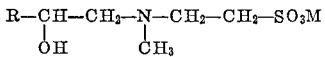

wherein R is a straight chain alkyl radical having from 10 to 18 carbon atoms, and M is ammonium or an alkali metal ion.

Although the foregoing process has been described utilizing a $C_{10}$–$C_{18}$ alpha-olefin starting material it is obvious that any fraction in this carbon atom range can be utilized, for example, a $C_{15}$–$C_{17}$ fraction is particularly preferred. In all cases, however, it is necessary that the alpha-olefin fraction which is produced by the thermal cracking of a paraffin wax fraction must be furfural extracted in the manner described in order to remove the color-forming compounds which would carry on through the process and produce a final product of poor color.

The following examples are provided for the purpose of illustrating the invention in greater detail but these are not to be construed as limiting the invention thereto.

EXAMPLE I

A commercial $C_{15}$–$C_{17}$ alpha-olefin obtained from the thermal cracking of a wax blend had an analysis of 88.4 weight percent alpha-olefin, 4.9 weight percent paraffin and 6.7 weight percent more highly unsaturated compounds including aromatics and alkylated aromatics. It also had a sulfur content of 240 parts per million. This material was quite dark in color, having an ASTM color of 1.5 (ASTM Method D-1500). It was extracted with furfural and Table I shows that the color of the extracted olefin depends on the temperature and the ratio of furfural to olefin. The extractions were carried out in a continuous Podbielniak extractor.

TABLE I

| Run | Extraction Temp., ° F. | Furfural/Olefin (Weight Ratio) | Saybolt Color (ASTM Method—D-156) |
|---|---|---|---|
| A | 165 | 0.9 | +3 |
| B | 160 | 1.3 | +14 |
| C | 160 | 3.1 | +21 |

The removal of the aromatics and ring sulfur impurities from the olefin gave a good color detergent product. The material from run C analyzed 90.3 weight percent alpha-olefins, 6.6 weight percent paraffins and 3.1 weight percent other unsaturates. The sulfur was reduced to 93 p.p.m. and the color was too light to determine by ASTM scale and consequently was measured by the Saybolt method (ASTM Method D-156). An ASTM color of 0.5 corresponds to about a −16 Saybolt color. This example shows the effectiveness of furfural extraction for the removal of color bodies from the alpha-olefin starting material.

A number of other methods were examined in an attempt to find the most economical and efficient method to remove the color bodies from alpha-olefins, e.g. caustic washing, silica gel percolation, and the use of other selective adsorbents and solvents. None of these were as efficient, economical and practical as the furfural solvent extraction method of this invention.

EXAMPLE II

A similar sample of $C_{15}$–$C_{17}$ alpha-olefins was extracted in a single stage batch extraction with a furfural to olefin ratio of 1:1 and at 160° F. The extracted material was separated and analyzed by mass-, ultraviolet- and infrared spectrometry. The extract contained diolefins and cycloolefins, alkylbenzenes, indans and tetralins, benzothiophene, naphthalenes, diphenyls, fluorene and phenanthrene. All the above impurities are undesirable because of side reactions and/or color.

EXAMPLE III

The nearly colorless extracted alpha-olefins produced in a manner similar to Run C of Example I were epoxidized utilizing the previously described conventional procedures. The resulting 1,2-epoxides had nearly the same color as that of the extracted olefin, i.e. they were substantially color free. The condensation of these epoxides with the sodium salt of N-methyltaurine gave a nearly colorless detergent with excellent foam building properties. Four different samples of a $C_{15}$–$C_{17}$ alpha-olefin fraction were treated as shown below, and in those runs where the alpha-olefins were extracted a 1:1 furfural to olefin weight ratio and a temperature of 160° F. was employed. The color of the detergent addition product was determined for 10 percent solutions in water. Table II shows the results obtained.

TABLE II

| Run | $C_{15}$–$C_{17}$ Olefin Color (ASTM) | Olefin Color After Furfural Extraction (Saybolt) | Color of 10 weight percent Detergent Solutions in Water | |
|---|---|---|---|---|
| | | | For Dark Colors (ASTM) | For Light Colors (Saybolt) |
| D | ½ | (¹) | 4.5 | |
| D | ½ | (¹) | 3.5 | |
| F | 1 | +10 | ½ | |
| G | 1½ | +18 | | +12 |

¹ Not extracted.

In general it has been found that by proper selection of the furfural to olefin weight ratio, Saybolt colors of the olefin product of +14 and higher can be obtained and the color of the epoxidized olefin-taurine condensation product is as light as the olefin starting material. Moreover, the color of a 10 weight percent aqueous solution of these condensation products has a Saybolt color of +12 or higher. Since the higher numbers correspond to lighter colors it is seen that a marked improvement in color of a detergent product is obtained in accordance with the process of this invention and that the detergent solutions are substantially color-free.

We claim:

1. In the process for producing condensation products from $C_{10}$ to $C_{18}$ epoxides and an alkali metal or ammonium taurine salt wherein a $C_{10}$ to $C_{18}$ alpha-olefin is epoxidized to produce the $C_{10}$–$C_{18}$ 1,2-epoxide and the epoxide is condensed with an alkali metal or ammonium taurine salt, the improvement which consists of producing substantially color-free condensation products by extracting the $C_{10}$–$C_{18}$ alpha-olefin fraction with furfural, at a temperature in the range of from 150° F. to 200° F. and the furfural to olefin weight ratio is from 0.5:1 to 5.0:1.

2. The process according to claim 1 wherein the olefin fraction to be extracted contains from 15 to 17 carbon atoms.

3. The process according to claim 1 wherein the extracted alpha-olefin fraction has a Saybolt color of at least +14.

4. The process according to claim 1 wherein a 10 weight percent aqueous solution of said condensation products has a Saybolt color of at least +12.

References Cited

UNITED STATES PATENTS 3,084,187   4/1963   Gaertner.

DANIEL D. HORWITZ, *Primary Examiner.*